United States Patent
Ohuchi et al.

(10) Patent No.: US 7,363,815 B2
(45) Date of Patent: Apr. 29, 2008

(54) ANGULAR VELOCITY SENSOR

(75) Inventors: Satoshi Ohuchi, Nishinomiya (JP); Toshiyuki Nozoe, Kyoto (JP); Hiroyuki Aizawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 247 days.

(21) Appl. No.: 11/262,769

(22) Filed: Nov. 1, 2005

(65) Prior Publication Data

US 2006/0090565 A1   May 4, 2006

(30) Foreign Application Priority Data

Nov. 4, 2004   (JP)   ............... 2004-320238

(51) Int. Cl.
G01C 19/56 (2006.01)
G01P 9/04 (2006.01)
(52) U.S. Cl. .................................. 73/504.16
(58) Field of Classification Search ............. 73/504.16, 73/504.12, 504.04, 504.15; 310/370
See application file for complete search history.

(56) References Cited

U.S. PATENT DOCUMENTS 6,810,735 B2   11/2004   Kaneko et al.
7,043,986 B2 *   5/2006   Kikuchi et al. ............ 73/504.12
7,084,556 B1 *   8/2006   Dalla Piazza et al. ...... 310/370
7,140,251 B2 *   11/2006   Kawauchi et al. ....... 73/504.16

FOREIGN PATENT DOCUMENTS

| JP | 11-248459 | * | 9/1999 |
| JP | 2003-227844 | | 8/2003 |
| JP | 2006-58101 | * | 3/2006 |

* cited by examiner

*Primary Examiner*—Helen Kwok
(74) *Attorney, Agent, or Firm*—Wenderoth, Lind & Ponack, L.L.P.

(57) ABSTRACT

An angular velocity sensor is provided with an oscillator including a pair of drive arms, a base portion coupled to one end of each drive arm, and a flexible arm extending from the base portion in a direction opposite from the drive arms. This angular velocity sensor is also provided with a driving member which oscillates the pair of drive arms in an approaching or separating direction, and a distortion detecting member which detects a distortion of the flexible arm in the oscillating direction of the drive arms.

9 Claims, 7 Drawing Sheets

ANGULAR VELOCITY SENSOR

TECHNICAL FIELD

The present invention relates to an angular velocity sensor used in various electronic apparatuses for the posture control and navigation of moving bodies such as airplanes, automotive vehicles, robots, ships and vessels, and vehicles.

BACKGROUND TECHNOLOGY

A conventional angular velocity sensor is described below.

The conventional angular velocity sensor calculates an angular velocity, for example, by causing an oscillator having one of various shapes including the shape of a tuning fork, an H shape and a T shape to oscillate and electrically detect a distortion of the oscillator resulting from the production of a Coriolis force. Such an angular velocity sensor is used in navigation apparatuses and vehicle control apparatuses installed in vehicles.

For example, in an angular velocity sensor for a navigation apparatus, if a vehicle is placed on a XY plane defined by X-axis and Y-axis with X-, Y-, and Z-axes being orthogonal to each other, an angular velocity about Z-axis (yaw-axis) of the vehicle needs to be calculated.

The oscillator used in this angular velocity sensor is normally so disposed as to stand upward in the vehicle, i.e. along Z-axis. Upon an angular velocity about the Z-axis, a distortion resulting from a Coriolis force is produced in a direction orthogonal to oscillating directions of the oscillator on the XY plane. This distortion is detected to calculate an angular velocity.

For example, Japanese Unexamined Patent Publication No. 2003-227844 is known as a prior art document relating to the present invention.

The oscillator having the above construction basically needs to be used while standing on the plane orthogonal to an axis of rotation of the angular velocity to be calculated. Thus, there has been a problem of being unable to reduce the height of the angular velocity sensor along a direction of the axis of rotation due to the height of the oscillator.

SUMMARY OF THE INVENTION

In view of the problem residing in the prior art, an object of the present invention is to provide an angular velocity sensor which can have the height thereof shortened along a direction of an axis of rotation of an angular velocity.

In order to solve the above problem, the invention is directed to an angular velocity sensor, comprising an oscillator including a pair of drive arms extending in parallel with each other, a base portion coupled to one end of each drive arm, and a flexible arm whose center line passes between the pair of drive arms; a driving member which oscillates the pair of drive arms in an approaching direction or a separating direction; and a distortion detecting member which detects a distortion of the flexible arm in oscillating directions of the drive arms.

With this construction, even if the oscillator is so laid as to face an XY plane defined by X- and Y-axes with X-, Y- and Z-axes being orthogonal to each other, stresses act on the two drive arms in the opposite direction along Y-axis direction upon the occurrence of an angular velocity about the Z-axis with the drive arms driven and oscillated along the X-axis direction, whereby the base portion is flexed and oscillated along the Y-axis direction. The flex oscillation of this base portion is transmitted to the flexible arm, which is then flexed and oscillated along the X-axis direction. Thus, an angular velocity can be calculated by detecting the distortion of the flexible arm resulting from this flex oscillation.

As a result, the angular velocity can be calculated even if the oscillator is laid on the plane orthogonal to the axis of rotation of the angular velocity, and the angular velocity sensor designed to reduce its height along the axis of rotation of the angular velocity can be provided.

DETAILED DESCRIPTION OF PREFERABLE EMBODIMENTS OF THE INVENTION

Hereinafter, one embodiment of the present invention is described with reference to the accompanying drawings.

Figure 1:
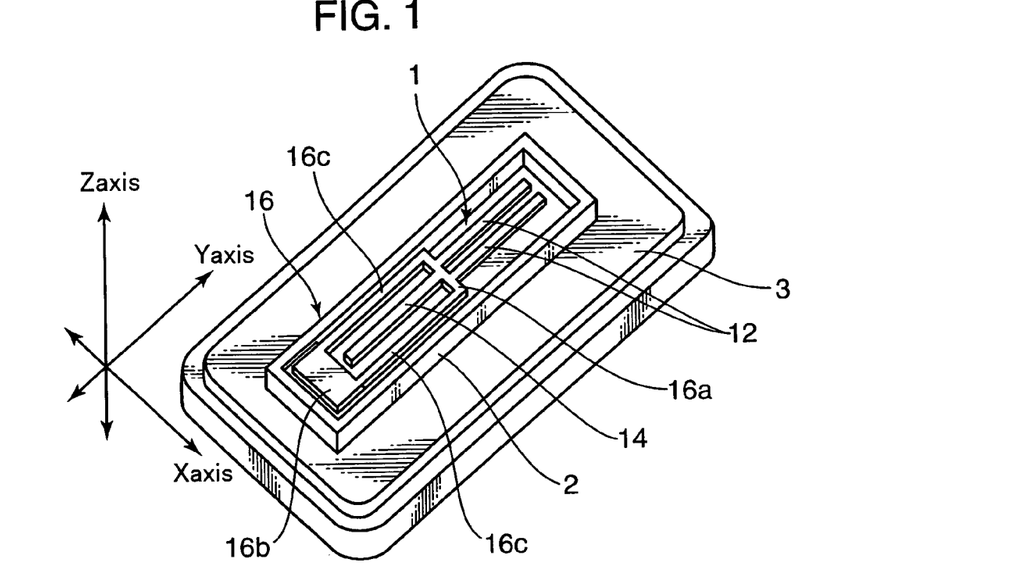
FIG. 1 is a perspective view of an angular velocity sensor without a casing according to one embodiment of the invention.
Figure 2:
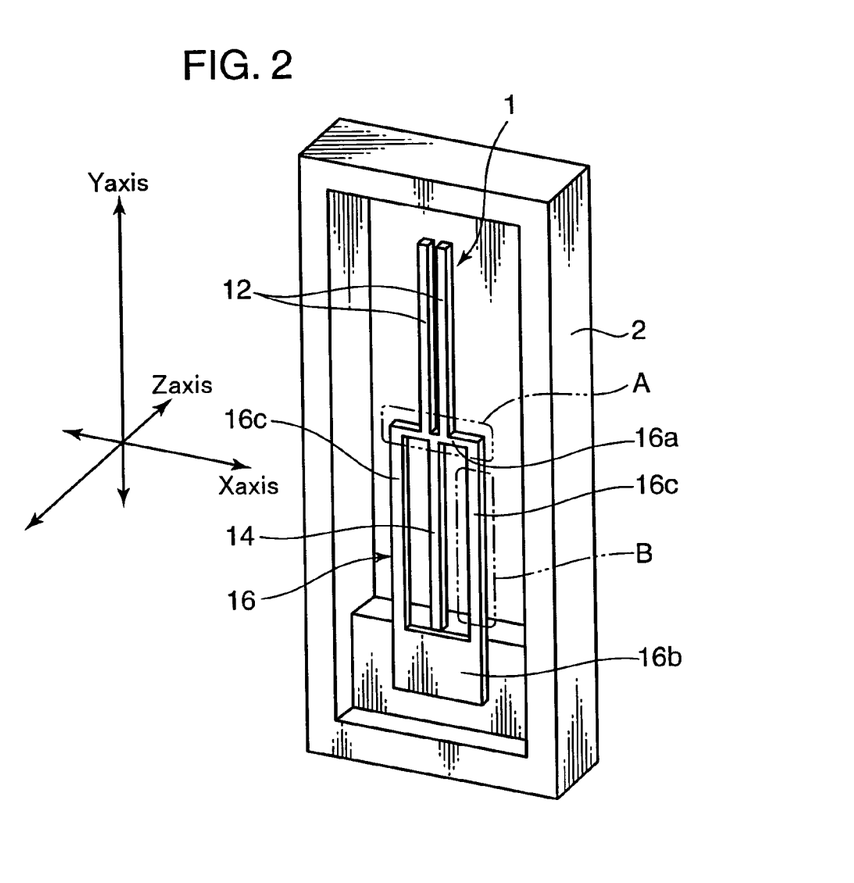
FIG. 2 is a perspective view of an oscillator when the angular velocity sensor is mounted on a supporting element.
Figure 3:
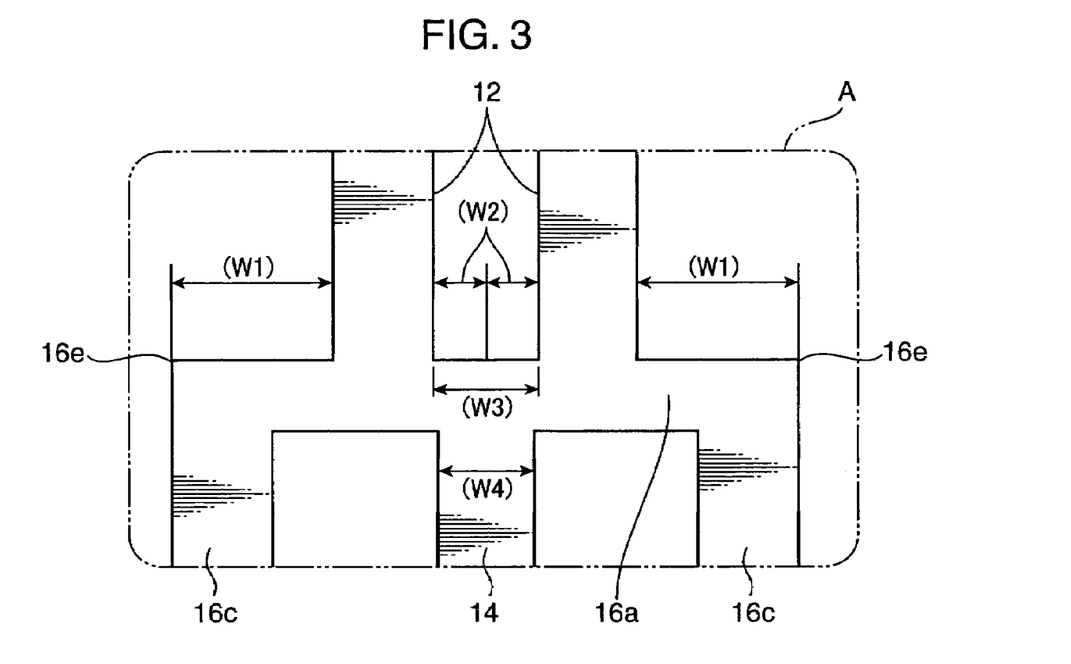
FIG. 3 is an enlarged plan view of a portion A in FIG. 2.
Figure 4:
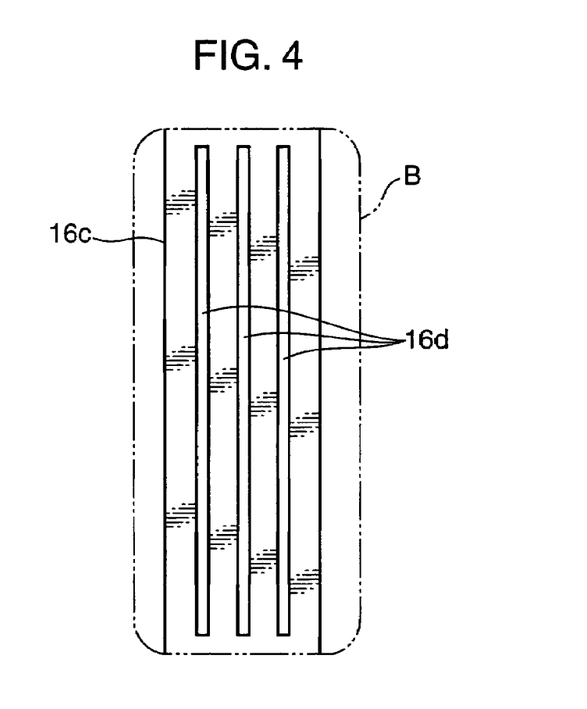
FIG. 4 is an enlarged plan view of a portion B in FIG. 2.
Figure 5:
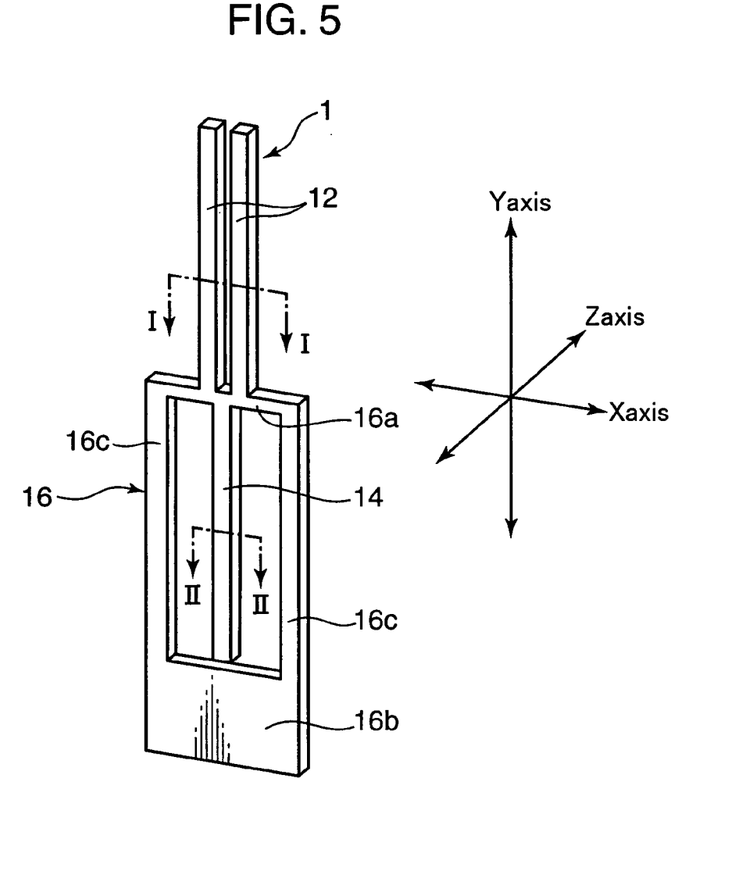
FIG. 5 is a perspective view of the oscillator of the angular velocity sensor.
Figure 6:
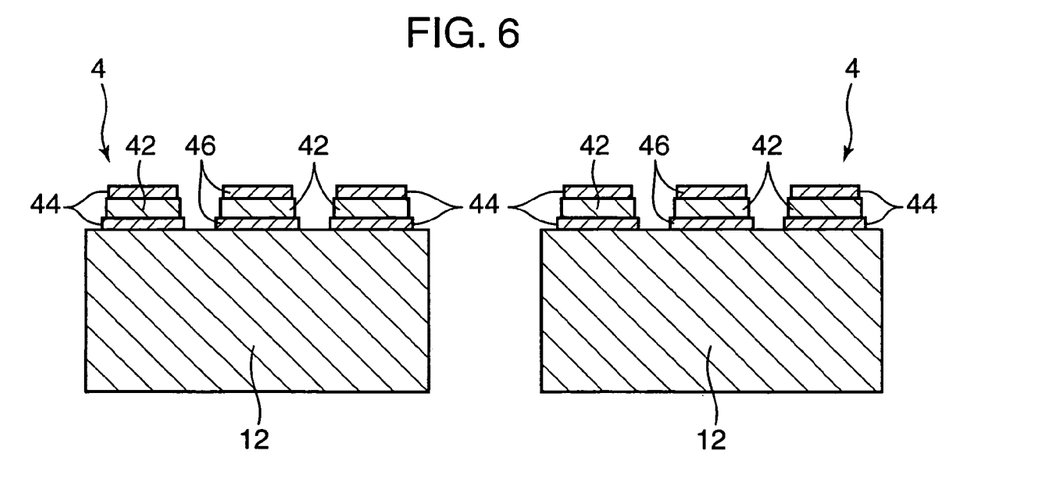
FIG. 6 is a section along I-I of FIG. 5.
Figure 7:
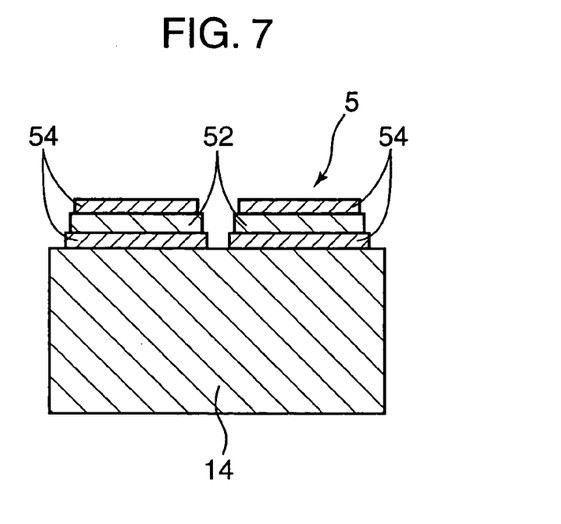
FIG. 7 is a section along II-II of FIG. 5.

FIG. 1 is a perspective view of an angular velocity sensor without a casing according to one embodiment of the invention; FIG. 2 is a perspective view of an oscillator when the angular velocity sensor is mounted on a supporting element; FIG. 3 is an enlarged plan view of a portion A in FIG. 2; FIG. 4 is an enlarged plan view of a portion B in FIG. 2; FIG. 5 is a perspective view of the oscillator of the angular velocity sensor; FIG. 6 is a section along I-I of FIG. 5; and FIG. 7 is a section along II-II of FIG. 5.

In FIGS. 1 to 4, the angular velocity sensor according to this embodiment is provided with an oscillator 1 including a pair of drive arms 12 for drive oscillation and a flexible arm 14 for flex oscillation, and this oscillator 1 is mounted on a base 3 by being attached to a supporting element 2. Circuits and the like for driving the oscillator 1 and calculating a distortion detected by a distortion detecting member 5 to be described later as an angular velocity are arranged on the base 3, and a casing or the like is mounted on the base 3 (not shown).

The oscillator 1 is laid on an XY plane defined by X- and Y-axes to calculate an angular velocity about the Z-axis in this state, wherein the X-, Y- and Z-axes are orthogonal to each other. The oscillator 1 is formed by a substrate made of silicon or like material.

The drive arms 12 and the flexible arm 14 extend in opposite directions along the Y-axis direction from a middle part of a base portion 16a extending in the X-axis direction. Although the positional relationship of the drive arms 12 and the flexible arm 14 is described in detail later, the flexible arm 14 is coupled to the base portion 16a between positions where ends of the drive arms 12 are coupled to the base portion 16a.

The base portion 16a forms a rectangular frame 16 together with an opposite portion 16b opposed to the base portion 16a with the flexible arm 14 located therebetween, and a pair of connecting portions 16c extending along the Y-axis direction at the opposite sides of the flexible arm 14 to connect the ends of the base portion 16a and those of the opposite portion 16b. In other words, a pair of drive arms 12 are so coupled as to leave corner portions 16e (see FIG. 3) at the outer side of one side (base portion 16a) of the frame 16, whereas the flexible arm 14 is so coupled as to extend toward a side (opposite portion 16b) opposite from this one side at the inner side of the one side. The opposite portion 16b serves as a fixing base portion for fixing the oscillator 1 to the supporting element 2.

As shown in FIG. 3, the drive arms 12 and the flexible arm 14 are arranged such that distances (W1) between the corner portions 16e of the frame 16 to the corresponding drive arms 12 are longer than a distance (W2) from the drive arms 12 to the center of the base portion 16a, and a spacing (W3=W2×2) between the drive arms 12 is set to be substantially equal to width (W4) of the flexible arm 14.

Each connecting portion 16c connecting the end of the base portion 16a and that of the opposite portion 16b is formed with oscillation absorbing portions 16d for absorbing the oscillation of the frame 16. The oscillation absorbing portions 16d are a plurality of grooves extending in Y-axis direction and formed in the connecting portion 16c. It should be noted that the oscillation absorbing portions 16d may be a plurality of slits extending in the Y-axis direction and formed in the connecting portion 16c.

As shown in FIG. 6, driving member 4 which oscillates the drive arms 12 in approaching or separating direction, i.e. along the X-axis direction are provided on surfaces of the drive arms 12 at one side. Each driving member 4 includes three piezoelectric films 42 arranged side by side along the X-axis direction. These piezoelectric films 42 are made of PZT (lead zirconate titanate). The piezoelectric films 42 are placed on one surface of the drive arm 12 with the left and right piezoelectric films 42 held between driving electrodes 44 and the middle piezoelectric film 42 held between detecting electrodes 46 for detecting an angular velocity about the Y-axis. It should be noted that the piezoelectric films 42 may be made of crystal or like material.

As shown in FIG. 7, distortion detecting member 5 which detects a distortion of the flexible arm 14 resulting from a Coriolis force is provided on one surface of the flexible arm 14. This distortion detecting member 5 includes two piezoelectric films 52 arranged side by side along the X-axis direction. These piezoelectric films 52 are made of PZT or like material, and are placed on one surface of the flexible arm 14 while being held between distortion detecting electrodes 54.

Next, a driven state and a flexed state of the oscillator 1 of the angular velocity sensor are described.

Figure 8:
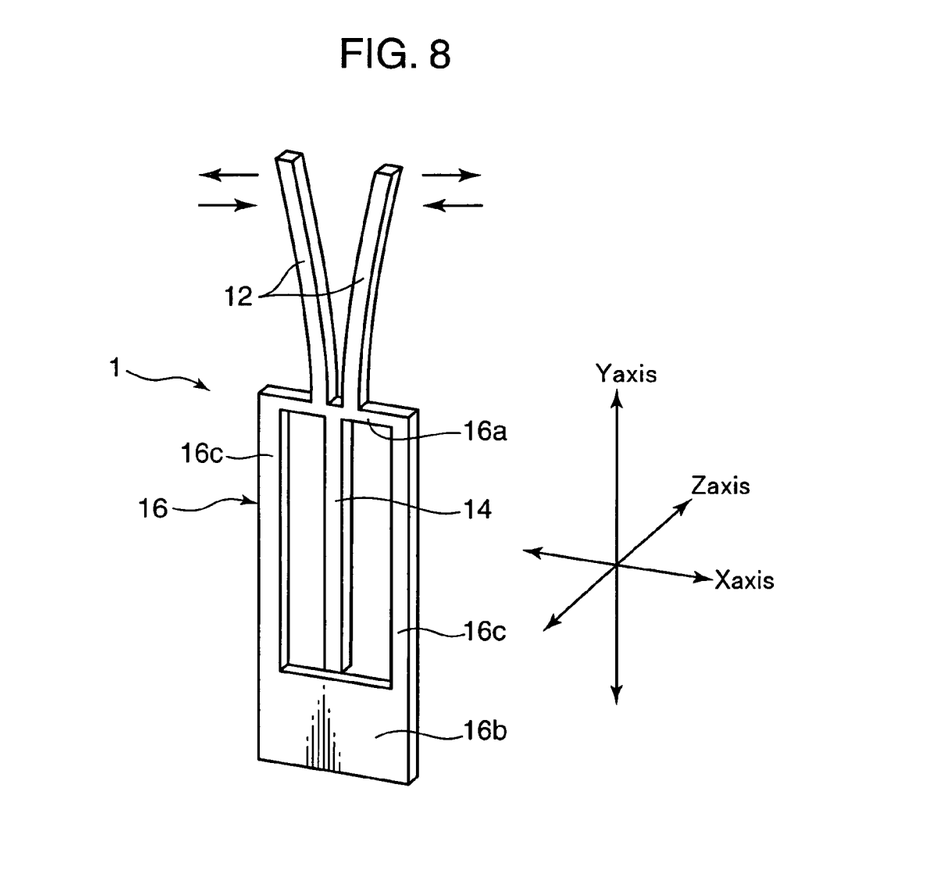
FIG. 8 is a perspective view of the oscillator of the angular velocity sensor showing a state where drive arms are driven and oscillated.
Figure 9:
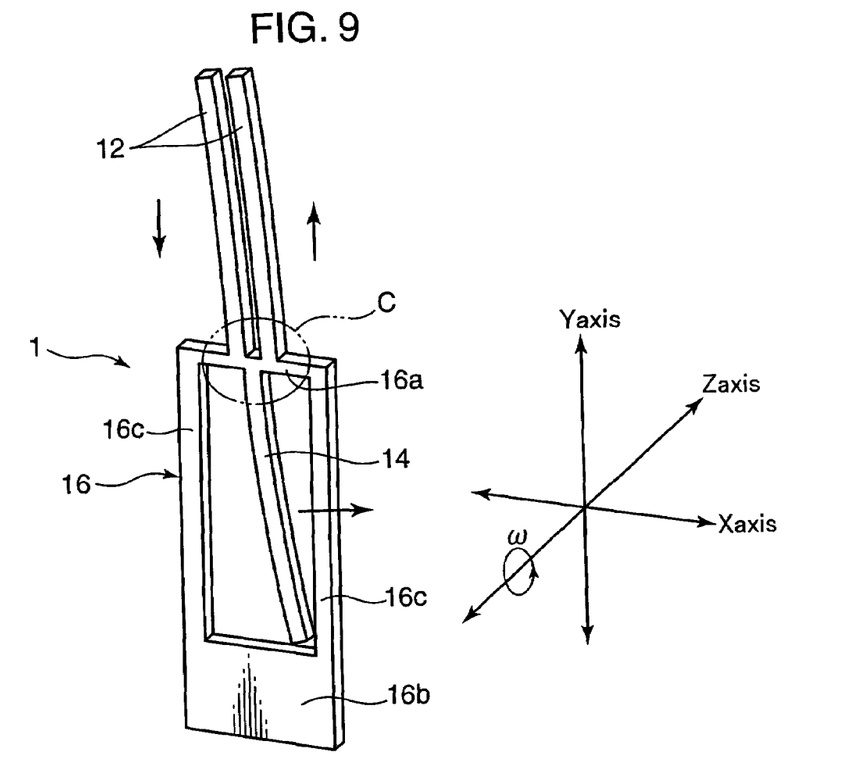
FIG. 9 is a perspective view of the oscillator of the angular velocity sensor showing a state where a flexible arm is flexed and oscillated.
Figure 10:
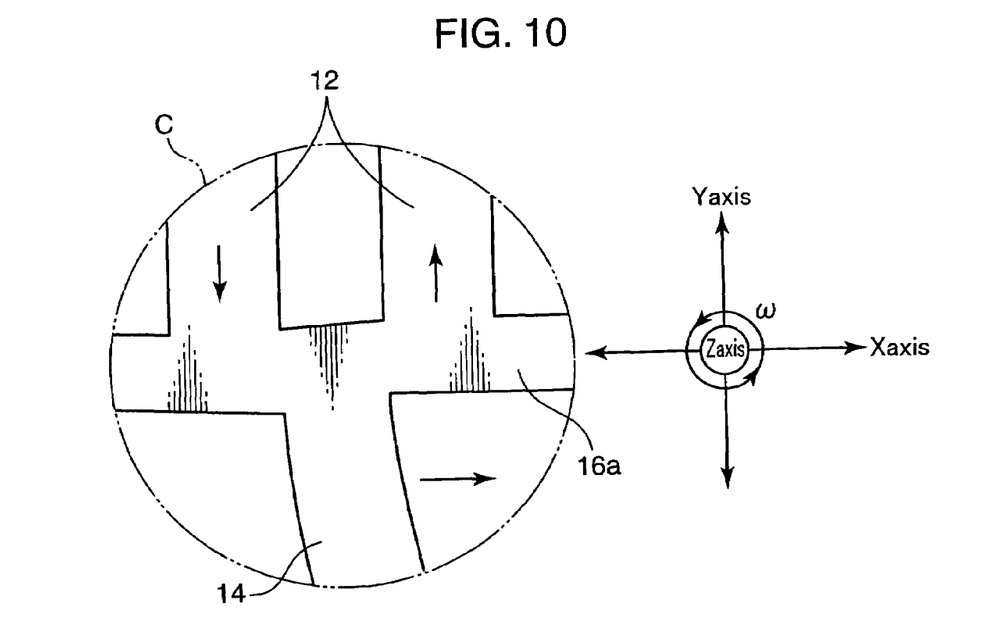
FIG. 10 is an enlarged diagram of a portion C in FIG. 9 in the case where an angular velocity occurs counterclockwise about the Z-axis.
Figure 11:
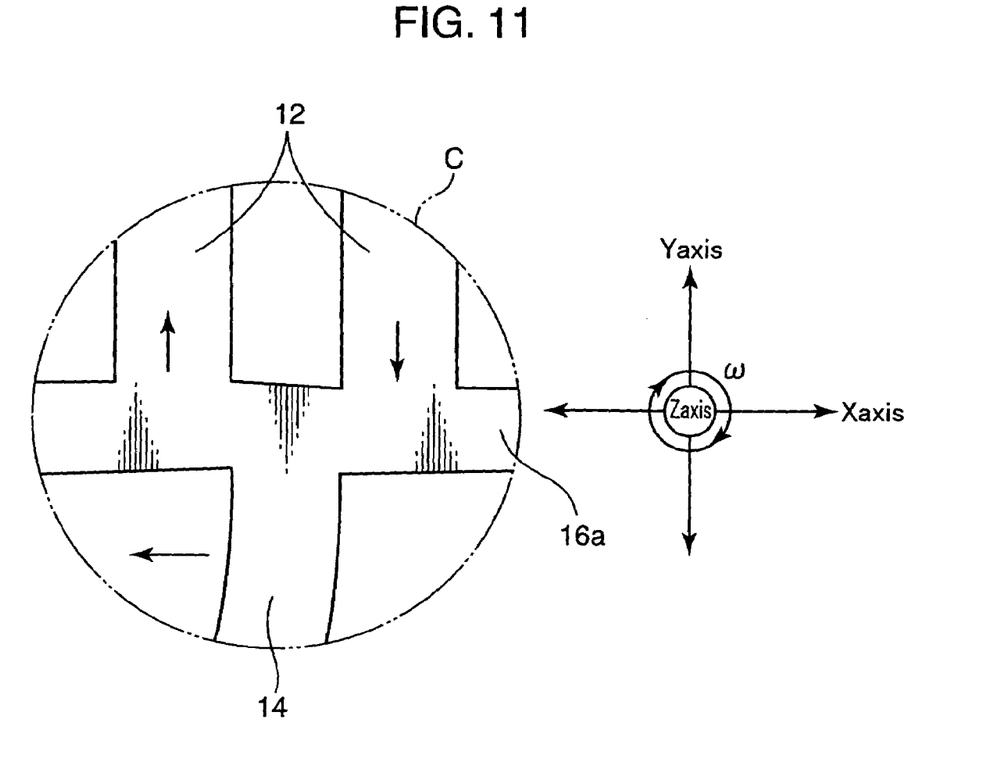
FIG. 11 is an enlarged diagram of the portion C in FIG. 9 in the case where an angular velocity occurs clockwise about the Z-axis.

FIG. 8 is a perspective view of the oscillator of the angular velocity sensor showing a state where the drive arms are driven and oscillated; FIG. 9 is a perspective view of the oscillator of the angular velocity sensor showing a state where the flexible arm is flexed and oscillated; FIG. 10 is an enlarged diagram of a portion C in FIG. 9 in the case where the angular velocity occurs counterclockwise about the Z-axis; and FIG. 11 is an enlarged diagram of the portion C in FIG. 9 in the case where the angular velocity occurs clockwise about the Z-axis.

As shown in FIG. 8, the drive arms 12 of the oscillator 1 are alternately driven and oscillated outward and inward along the X-axis direction. This drive oscillation is carried out as follows. The piezoelectric films 42 are distorted by applying sine wave voltages to the upper ones of the driving electrodes 44 holding the left and right piezoelectric films 42 in FIG. 6 in such a manner as to have reverse phases, whereby the drive arms 12 are driven along the X-axis direction. The application of the voltage is not limited to the above, and voltage may be applied to the lower driving electrodes 44.

If an angular velocity ω occurs counterclockwise about Z-axis as shown in FIG. 9 with the drive arms 12 driven and oscillated as above, the two drive arms 12 receive forces resulting from the Coriolis force along Y-axis direction. At this time, one drive arm 12 and the other drive arm 12 receive such forces acting in opposite directions along the Y-axis direction, i.e. forces acting in directions of arrows.

As a result, the flexible arm 14 is distorted in a direction of the arrow along the X-axis direction, and a voltage change is detected by the distortion detecting electrodes 54 holding the piezoelectric films 52 in FIG. 7.

In the case of the angular velocity ω occurring counterclockwise about the Z-axis as shown in FIG. 10, which shows an enlarged view of the portion C of FIG. 9, the drive arms 12 receive forces resulting from the Coriolis force and acting in the directions of the arrows, whereby the flexible arm 14 is flexed and oscillated in the direction of the arrow. Further, in the case of the angular velocity ω occurring clockwise about the Z-axis, the drive arms 12 receive forces resulting from the Coriolis force and acting in directions of the arrows, and the flexible arm 14 is flexed and oscillated in a direction of the arrow as shown in FIG. 11. In other words, the angular velocity can be calculated by detecting the flex oscillation of the flexible arm 14 as a distortion.

As described above, according to this embodiment, the angular velocity can be calculated even if the oscillator 1 is laid on the plane orthogonal to the axis of rotation of the angular velocity ω, and the angular velocity sensor which can have the height thereof reduced in the direction of the axis of rotation of the angular velocity ω can be provided. In other words, even in the case that the oscillator 1 is so laid as to face the XY plane defined by X- and Y-axes with X-, Y- and Z-axes being orthogonal to each other, stresses act on the two drive arms 12 in the opposite direction along the Y-axis direction to flex and oscillate the base portion 16a along the y-axis direction if the angular velocity occurs about the Z-axis with the drive arms 12 driven and oscillated along the X-axis direction. The flex oscillation of the base portion 16a is transmitted to the flexible arm 14, which is flexed and oscillated along the X-axis direction. Therefore, the angular velocity can be calculated by detecting the distortion of the flexible arm 14 resulting from this flex oscillation.

Since the opposite portion 16b opposed to the base portion 16a of the frame 16 serves as a fixing base portion for fixing the oscillator 1, losses are reduced when the drive arms 12 are driven and oscillated and the flexible arm 14 is flexed and oscillated, thereby improving properties. Normally, these oscillations are transmitted or leaked to the base 3, the casing and the like by way of the fixing base portion (opposite portion 16b) to fixedly mount the oscillator 1 on the base 3. It is, thus, necessary to reduce these leakage oscillations. With the above construction, the leakage oscillations to the outside can be reduced by means of the fixing base portion (opposite portion 16b) to improve the properties. Particularly, since the flexible arm 14 extends from the base portion 16a toward the opposite portion 16b, the length of the connecting portion 16c inevitably becomes longer and the leakage oscillations can be effectively reduced by the connecting portions 16c. In the case of fixing the opposite ends of the base portion 16a to the supporting element 2, the movement of the base portion 16a is restricted and the flex oscillation of the flexible arm 14 is induced only by the deformation of the base portion 16a. The base portion 16a is made movable and the flex oscillation of the flexible arm 14 is induced by the deformation and movement of the base portion 16a by letting the opposite portion 16b opposed to the base portion 16a serve as the fixing base portion. Therefore, sensitivity to detect the distortion of the flexible arm 14 can also be improved.

Further, since the oscillation absorbing portions 16d for absorbing the oscillation of the frame 16 are formed in the connecting portions 16c connecting the base portion 16a and the opposite portion 16b of the frame, the above effects can be obtained to a larger extent. The oscillation absorbing portions 16d can be simply formed by forming grooves or slits in the connecting portions 16c.

If the frame 16 has a rectangular shape, the drive arms 12 are provided between the two corner portions 16e of the frame 16 and the distance (w3) between the drive arms 12 is substantially equal to the width (W4) of the flexible arm 14, the effect of reducing the leakage oscillations can be more effectively exhibited.

It should be noted that the distance (W3) between the drive arms 12 and the width (W4) of the flexible arm 14 need not necessarily be substantially equal to each other, and the width (W4) of the flexible arm 14 may be set to be longer than the distance (W3) between the drive arms 12. In such a case, the flexible arm 14 cannot be coupled to the base portion 16a between the positions coupled to the ends of the drive arms 12 at one side, but it is sufficient for the center line of the flexible arm 14 to pass between the pair of drive arms 12.

Conversely, if the width (W4) of the flexible arm 14 is set to be shorter than the distance (W3) between the drive arms 12, the flexible arm 14 may be arranged between the pair of drive arms 12 and may extend from the base portion 16a in the same direction as the drive arms 12. However, in such a case, the drive arms 12 to be driven and oscillated and the flexible arm 14 to be flexed and oscillated need to be sufficiently distanced from each other in order to avoid mutual interferences, which results in an increases in the width of the oscillator 1 along the X-axis direction.

The base portion 16a needs not necessarily form the frame 16. For example, the opposite portion 16b and the connecting portions 16c may be omitted and the base portion 16a may be extended along X-axis direction and have the opposite ends thereof fixed to the supporting element 2. However, the flexible arm 14 can be protected by the frame 16 by forming the frame 16 enclosing the flexible arm 14 by the base portion 16a, the opposite portion 16b and the connecting portions 16c.

Although the distances (W1) from the corner portions 16e of the frame 16 to the corresponding drive arms 12 are not substantially equal to the distance (W2) from the drive arms 12 to the center of the base portion 16a in this embodiment, these distances may be substantially equal. In other words, the distance (W1) is set to be substantially half the distance (W3) between the drive arms 12. In such a case, parts from the corner portions 16e of the frame 16 to the center of the base portion 16a become symmetric with respect to a line with the respective drive arms 12 as centers, and the drive oscillation occurs in a transversely well-balanced manner, thereby enabling an improvement in the precision of the drive oscillation.

Figure 12:
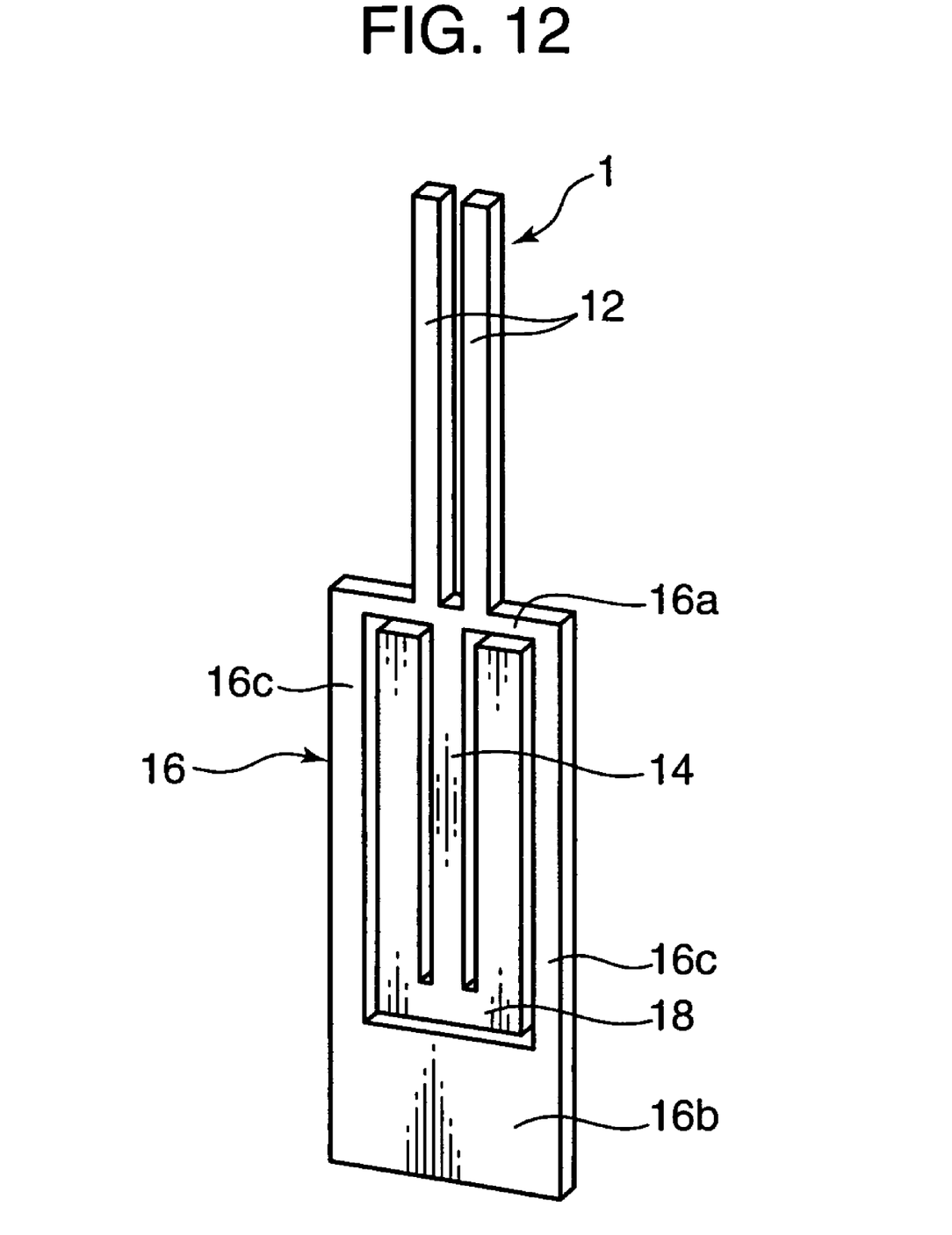
FIG. 12 is a perspective view of the oscillator having a plummet provided at the leading end of the flexible arm.

If a plummet 18 is provided at the leading end of the flexible arm 14 as shown in FIG. 12, distortion detecting sensitivity can be improved. This plummet 18 is substantially U-shaped in plan view and has the leading end of the flexible arm 14 connected at its center. The plummet 18 may be integrally formed upon forming the oscillator 1. The shape of the plummet 18 is not limited to a U shape, but the plummet 18 can be enlarged by effectively utilizing a clearance in the frame 16 by taking a U shape.

An acceleration sensor or various other sensors may be connected with this angular velocity sensor to construct a composite sensor. In such a case, if various sensors are supported on the fixing base portion, they are unlikely to interfere with each other.

As described above, the inventive angular velocity sensor is provided with the oscillator including a pair of drive arms extending in parallel with each other, the base portion coupled to one end of each drive arm, and the flexible arm whose center line passes between the pair of drive arms; the driving member which oscillates the pair of drive arms in an approaching direction or a separating direction, and the distortion detecting member which detects the distortion of the flexible arm in the oscillating direction of the drive arms.

With this construction, even if the oscillator is so laid as to face the XY plane defined by X- and Y-axes with the X-, Y- and Z-axes being orthogonal to each other, stresses act on the two drive arms in the opposite direction along the Y-axis direction upon the occurrence of an angular velocity about the Z-axis with the drive arms driven and oscillated along X-axis direction, whereby the base portion is flexed and oscillated in the Y-axis direction. The flex oscillation of this base portion is transmitted to the flexible arm, which is then flexed and oscillated along the X-axis direction. Thus, the angular velocity can be calculated by detecting the distortion of the flexible arm resulting from this flex oscillation.

As a result, the angular velocity can be calculated even if the oscillator is laid on the plane orthogonal to the axis of rotation of the angular velocity, and the angular velocity sensor designed to reduce its height along the axis of rotation of the angular velocity can be provided.

In the angular velocity sensor, the flexible arm preferably extends from the base portion in the direction opposite from the drive arms.

With this construction, the width of the oscillator along the oscillating direction of the drive arms can be reduced.

In the angular velocity sensor, the oscillator includes the rectangular frame, the pair of drive arms are coupled to the outer side of one side of this frame while leaving the corner portions of the frame, and the flexible arm is coupled to the inner side of this one side which serves as the base portion.

With this construction, the flexible arm can be protected by the frame.

Preferably, the angular velocity sensor further includes the supporting element for supporting the oscillator, and one side of the frame opposed to the base portion is fixed to the supporting element.

With this construction, the frame can be rationally utilized to suppress the leakage oscillation to the outside since the oscillation of the base portion can be reduced while being transmitted along the remaining two sides of the frame. Further, since the base portion is movable, sensitivity to detect the distortion of the flexible arm can be improved.

In the angular velocity sensor, the oscillation absorbing portions for absorbing the oscillation of the oscillator are formed in the respective two remaining sides of the frame.

With this construction, the leakage oscillation can be further reduced.

The oscillation absorbing portions are preferably grooves or slits formed in the remaining two sides.

With this construction, the oscillation absorbing portions can be easily formed.

In the angular velocity sensor, the distances from the corner portions of the frame to the corresponding drive arms are preferably substantially half the distance between the pair of drive arms.

With this construction, parts from the corner portions of the frame to the center of the base portion become symmetric with respect to a line with the respective drive arms as centers, whereby the drive oscillation occurs in a transversely well-balanced manner to improve the precision of the drive oscillation.

In the angular velocity sensor, the distance between the pair of drive arms is preferably substantially equal to the width of the flexible arm.

With this construction, the effect of reducing the leakage oscillation can be more effectively exhibited.

In the angular velocity sensor, the plummet is preferably provided at the leading end of the flexible arm.

With this construction, sensitivity to detect the distortion can be improved.

This application is based on Japanese patent application serial No. 2004-320238, filed in Japan Patent Office on Nov. 4, 2004, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds are therefore intended to be embraced by the claims.

What is claimed is:

1. An angular velocity sensor, comprising:
   an oscillator including a pair of drive arms extending in parallel with each other, a base portion coupled to one end of each drive arm, and a flexible arm whose center line passes between the pair of drive arms,
   a driving member which oscillates the pair of drive arms in an approaching or separating direction, and
   a distortion detecting member which detects a distortion of the flexible arm in the oscillating direction of the drive arms.

2. An angular velocity sensor according to claim 1, wherein the flexible arm extends from the base portion in a direction opposite from the drive arms.

3. An angular velocity sensor according to claim 1, wherein the oscillator includes a rectangular frame, the pair of drive arms are coupled to an outer side of one side of the frame while leaving corner portions of the frame, and the flexible arm is coupled to an inner side of the one side which serves as the base portion.

4. An angular velocity sensor according to claim 3, further comprising a supporting element for supporting the oscillator, wherein one side of the frame opposed to the base portion is fixed to the supporting element.

5. An angular velocity sensor according to claim 4, wherein oscillation absorbing portions for absorbing the oscillation of the oscillator are formed in the remaining two sides of the frame.

6. An angular velocity sensor according to claim 5, wherein the oscillation absorbing portions are grooves or slits formed in the remaining two sides.

7. An angular velocity sensor according to claim 3, wherein distances from the corner portions of the frame to the corresponding drive arms are set to be substantially half a distance between the pair of drive arms.

8. An angular velocity sensor according to claim 1, wherein a distance between the pair of drive arms is set to be substantially equal to a width of the flexible arm.

9. An angular velocity sensor according to claim 1, wherein a plummet is provided at a leading end of the flexible arm.

* * * * *